Nov. 15, 1966 W. SIMON 3,286,101
SAMPLE AND HOLD CIRCUIT
Filed Oct. 16, 1963
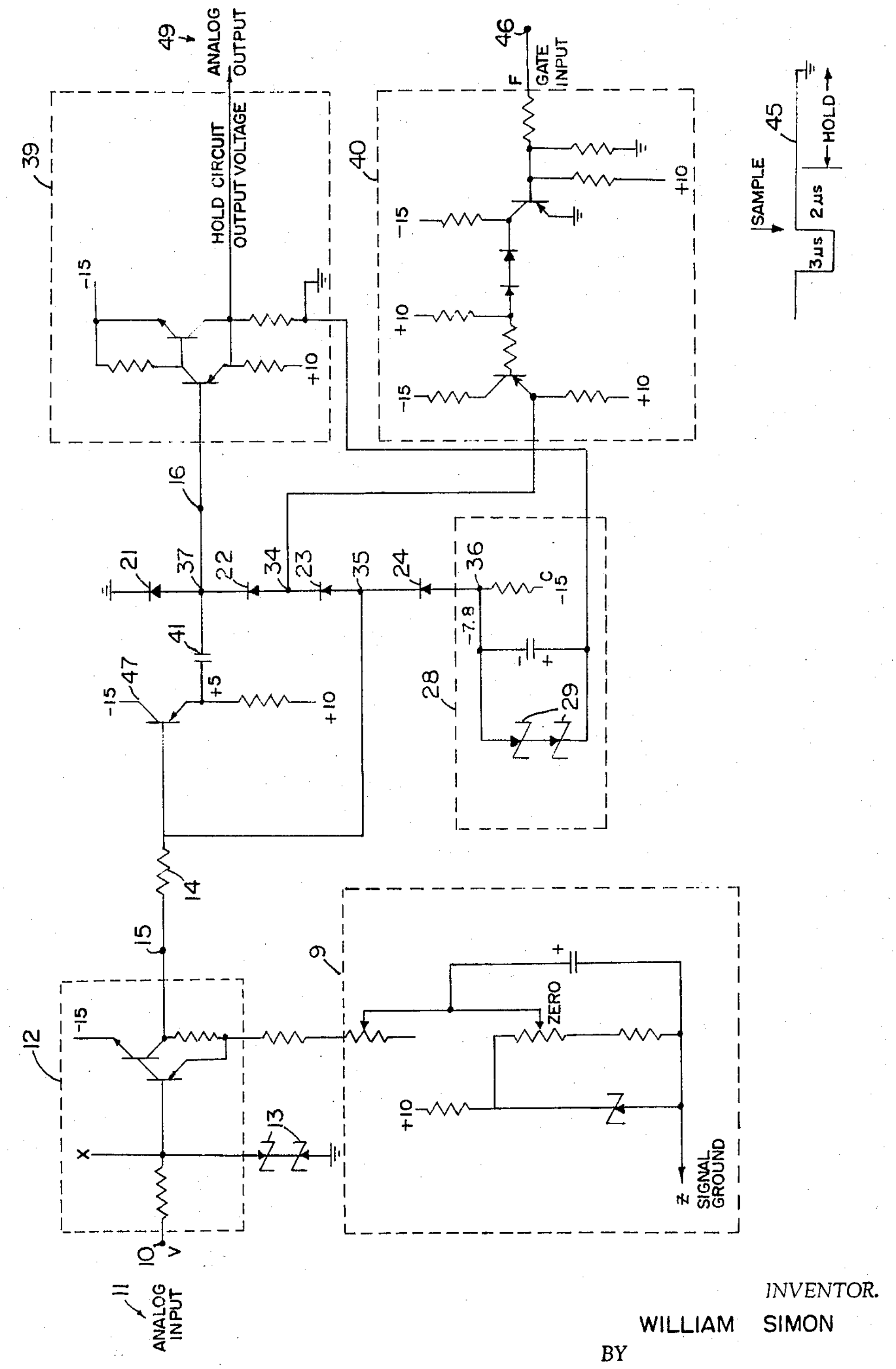
INVENTOR.
WILLIAM SIMON
BY
Richard F. Benway
ATTORNEY 3,286,101
Patented Nov. 15, 1966

3,286,101

SAMPLE AND HOLD CIRCUIT

William Simon, Cambridge, Mass., assignor to Massachusetts Institute of Technology, Cambridge, Mass., a corporation of Massachusetts Filed Oct. 16, 1963, Ser. No. 316,721
6 Claims. (Cl. 307—88.5)

This invention relates to sample and hold circuits and more particularly to such circuits when employed in connection with analog to digital converters.

Digital conversion processes cannot be done instantaneously; consequently, it is necessary to maintain the sample voltage for a period of time long enough for the conversion to be made. On the other hand, in most cases it is desirable to sample the signal voltage in a very short interval of time.

The present invention has a very small sampling window on the order of .1 to .5 microseconds and relatively long holding time on the order of 20 to 100 microseconds. Additionally, the present invention samples and holds analog signals with respect to ground which provides very clean and reliable signals. Further, by means of a voltage offset, a single pulse circuit switches the sample and hold circuit from its hold mode to its sample mode.

Therefore, an object of this invention is to provide a simple sample and hold circuit.

Another object of this invention is to provide a circuit which samples and holds analog voltages with reference to ground.

Another object of this invention is to switch a sample and hold circuit to ground by means of a single pulse circuit.

Other objects and advantages will be made more apparent from the following detailed description when taken in connection with the attached drawing which is a schematic diagram of one embodiment of this invention.

Analog input 11 is applied to terminal 10. Zener diodes 13 act as limiters to protect the circuit. Circuit configuration 12 is an emitter follower and is inserted to provide some isolation between the analog source and the hold circuit. Circuit configuration 9 provides a zero adjust.

Circuit configuration 28 with its zener diode 29 provides a fixed predetermined negative potential at point 36. Circuit configuration 39 is inserted between the load and the hold circuit in order to prevent loading down capacitor 41 during read out.

Circuit configuration 40 by means of gate signal 45 at gate input 46 switches the potential appearing at point 34 from one predetermined positive voltage level to another lower predetermined positive voltage level. A circuit 40, such as is shown, insures the voltage which would be critical in switching the diodes, at point 34 is as required (in the present case +8 v. or just slightly plus).

Resistor 14 is a current limiting resistor. Diodes 21, 22, 34, 24 cooperate in clamping points 37 and 35 to ground when the circuit is in the sample or hold mode respectively. Diodes 21 and 22 are substantially the same as one another and differ from diodes 23 and 24 which are also substantially the same as one another. Transistor 47 is inserted to provide a low impedance source from which to drive the capacitor while providing a high impedance to which a clamp may be applied.

Assuming an analog signal appears at point 15, and circuit configuration 40 is adjusted such that a predetermined fixed positive voltage appears at point 34. Further, circuit configuration 28 is of such a design that point 36 is at a fixed negative voltage slightly less in magnitude to that voltage appearing at point 34. As a result, point 35 is substantially clamped to ground by means of diodes 23 and 24. The positive voltage at point 34 is therefore impressed across diodes 21 and 22 such that one half of its value will appear at point 37.

When gate voltage 45 is applied to gate input terminal 46, circuit configuration 40 reduces the voltage at point 34 to some small positive value (approximately zero). As a consequence, point 37 is clamped to ground by means of diodes 21 and 22. And point 35 is switched to a negative potential corresponding in magnitude to that voltage which appears at point 36.

An analog signal appearing at point 15 causes capacitor 41 to charge to signal potential quickly owing to the small time constant of resistor 14 as it appears through transistor 47 and capacitor 41. From an examination of gate voltage 45, it is seen that the circuit requires approximately 3 microseconds to respond, and the sampling window commences at the end of this period and has a duration of approximately two microseconds.

When gate voltage no longer appears at circuit configuration 40, voltage at point 34 returns to its normal high positive value clamping point 35 once again to ground. At point 16 the analog voltage now appears ready for read out through emitter follower circuit 39 and point 37. As explained earlier emitter follower 39 prevents loading down capacitor 41 while the analog voltage is being read out.

While I have described my invention in connection with specific apparatus, it is to be clearly understood that this description is only made by way of example and not as a limitation on the scope of my invention as set forth in the objects thereof and in the accompanying claims.

I claim:

1. A sample and hold circuit having a sample window from .1 to .5 microsecond and a hold time of from 20 to 100 microseconds comprising:
   an analog voltage signal source,
   analog signal utilizing means,
   analog voltage holding means having an input and an output,
   first switch means for clamping the output terminal of said voltage holding means to ground permitting registration of an analog signal from said analog signal source on said analog voltage holding means for a period of from 0.1 to 0.5 microsecond,
   second switch means for clamping the input terminal of said voltage holding means to ground permitting transfer of said analog voltage signal from said voltage holding means to said signal utilizing means for a period of from 20 to 100 microseconds,
   switch controlling means controlling said first and second switching means,
   said controlling means capable of controlling said first and second switching means simultaneously, and said first and second switch means being coordinated such that when said first switch is closed, second switch is open, and when said second switch is closed, said first switch is opened.

2. A sample and hold circuit according to claim 1 wherein said voltage holding means is a capacitor.

3. A sample and hold circuit according to claim 1 which further includes; isolating means interposed between said second switching means and the input terminal of said voltage holding means.

4. A sample and hold circuit according to claim 3 wherein said isolating means is an emitter follower.

5. A sample and hold circuit according to claim 4, wherein said first switching means is a pair of series connected diodes having preselected bias in a preselected direction, said output terminal of said holding means connected to a terminal connection joining said series connecting diodes, and said second switching means is a pair of series connected diodes having preselected bias in a preselected direction, said input terminal of said voltage holding means connected to the terminal connection joining said series connected diodes through said isolating emitter follower.

6. A sample and hold circuit according to claim 5 wherein said switching control means is a pulse responsive circuit having a first and second preselected voltage output, the output of said switch control means applied simultaneously to said first and said second switching means at a preselected point of connection.

References Cited by the Examiner

UNITED STATES PATENTS

| | | | |
|---|---|---|---|
| 2,885,662 | 5/1959 | Hansen | 328—151 X |
| 3,033,994 | 5/1962 | Fujimoto et al. | 307—88.5 X |
| 3,085,131 | 4/1963 | Diehl | 307—88.5 X |
| 3,119,027 | 1/1964 | Faust | 307—88.5 |
| 3,134,027 | 6/1964 | Gray | 307—88.5 |
| 3,139,590 | 6/1964 | Brown | 330—9 |
| 3,147,446 | 9/1964 | Wittenberg | 330—9 |
| 3,172,049 | 3/1965 | Quittner et al. | 330—9 |
| 3,173,025 | 3/1965 | Davidson | 307—88.5 |
| 3,179,882 | 4/1965 | Le Clear | 328—127 X |
| 3,201,703 | 8/1965 | Becker | 328—150 |

OTHER REFERENCES

Popular Electronics, "The Zener Diode," by R. J. Shaughnessy, June 1961, pages 81 and 82.

ARTHUR GAUSS, *Primary Examiner.*

M. LEE, J. JORDAN, *Assistant Examiners.*